(12) United States Patent
Harashima et al.

(10) Patent No.: US 7,949,234 B2
(45) Date of Patent: May 24, 2011

(54) MOTOR SPEED CONTROL CIRCUIT

(75) Inventors: Takashi Harashima, Ota (JP); Koichiro Ogino, Ota (JP)

(73) Assignees: Sanyo Electric Co., Ltd., Osaka (JP); Sanyo Semiconductor Co., Ltd., Gunma (JP)

( * ) Notice: Subject to any disclaimer, the term of this patent is extended or adjusted under 35 U.S.C. 154(b) by 348 days.

(21) Appl. No.: 12/136,535

(22) Filed: Jun. 10, 2008

(65) Prior Publication Data
US 2008/0317445 A1 Dec. 25, 2008

(30) Foreign Application Priority Data

Jun. 13, 2007 (JP) ................................. 2007-156811
Jun. 13, 2007 (JP) ................................. 2007-156812

(51) Int. Cl.
*H02P 7/00* (2006.01)
*H02K 9/06* (2006.01)
*G05D 23/00* (2006.01)

(52) U.S. Cl. ........ 388/815; 388/822; 388/934; 318/798; 318/799; 318/400.06; 318/471

(58) Field of Classification Search .............. 318/700, 318/400.01, 400.03, 400.06, 779, 798, 799, 318/805, 807, 810, 811, 471; 388/809, 811, 388/816, 819, 822, 829, 934, 815

See application file for complete search history.

(56) References Cited

U.S. PATENT DOCUMENTS

| 4,856,078 A * | 8/1989 | Konopka ...................... 388/831 |
| 5,099,181 A * | 3/1992 | Canon ...................... 318/400.08 |
| 6,385,395 B1 * | 5/2002 | Horng et al. .................. 388/809 |
| 6,407,525 B1 * | 6/2002 | Horng et al. .................. 318/473 |
| 6,515,447 B2 * | 2/2003 | Horng et al. .................. 318/807 |
| 6,703,803 B2 * | 3/2004 | Ohiwa et al. .............. 318/400.17 |
| 6,737,860 B2 * | 5/2004 | Hsu et al. ........................ 324/161 |
| 6,943,517 B2 | 9/2005 | Yoshitomi et al. |
| 7,106,107 B2 * | 9/2006 | Bhattacharya et al. ......... 327/77 |
| 7,138,781 B2 * | 11/2006 | Murray et al. ............ 318/400.04 |
| 7,148,643 B2 | 12/2006 | Yoshitomi et al. |

(Continued)

FOREIGN PATENT DOCUMENTS
CN 1238962 C 1/2006
(Continued)

OTHER PUBLICATIONS

State Intellectual Property Office of P.R.C., Notification of First Office Action for Application No. 2008102103098, Mail Dated May 4, 2010.

*Primary Examiner* — Eduardo Colon-Santana
(74) *Attorney, Agent, or Firm* — SoCal IP Law Group LLP; Steven C. Sereboff; John E. Gunther

(57) ABSTRACT

A motor speed control circuit includes: a voltage generating circuit configured to change either a reference voltage corresponding to a target rotation speed of a motor or a speed voltage corresponding to a rotation speed of the motor, according to a temperature, and output the reference voltage and the speed voltage, either one of which is changed; a comparison circuit configured to compare the speed voltage output from the voltage generating circuit with the reference voltage output from the voltage generating circuit; and a driving circuit configured to drive the motor so as to match a level of the speed voltage to a level of the reference voltage, based on a comparison result from the comparison circuit.

12 Claims, 14 Drawing Sheets

U.S. PATENT DOCUMENTS

| | | | |
|---|---|---|---|
| 7,386,224 B2 * | 6/2008 | Hsieh | 388/829 |
| 7,564,204 B2 | 7/2009 | Ogino et al. | |
| 2002/0109475 A1 * | 8/2002 | Horng et al. | 318/473 |
| 2005/0047761 A1 * | 3/2005 | Babb et al. | 388/805 |
| 2005/0243482 A1 * | 11/2005 | Lee | 361/33 |
| 2007/0156292 A1 * | 7/2007 | Frankel et al. | 700/300 |

FOREIGN PATENT DOCUMENTS

| | | |
|---|---|---|
| CN | 1925312 A | 3/2007 |
| JP | 2007-068344 | 3/2007 |

* cited by examiner

MOTOR SPEED CONTROL CIRCUIT

CROSS-REFERENCE TO RELATED APPLICATION

This application claims the benefit of priority to Japanese Patent Application No. 2007-156811 and No. 2007-156812, filed Jun. 13, 2007 and Jun. 13, 2007, respectively, of which full contents are incorporated herein by reference.

BACKGROUND OF THE INVENTION

1. Field of the Invention

The present invention relates to a motor speed control circuit.

2. Description of the Related Art

Recently, heat generation from such an integrated circuit as CPU (Central Processing Circuit) used for electric equipment has been increasing as the operation speed of the integrated circuit increases. The CPU's increase in the amount of heat generated causes problems such as a thermal runaway. To deal with this problem, electric apparatus is usually provided with a fan for cooling the CPU.

FIG. 16 depicts an example of a block diagram of a motor speed control circuit that controls the rotation speed of a fan motor for cooling a CPU (see Japanese Patent Application Laid-Open Publication No. 2007-68344). Specifically, a speed control signal from a microcomputer etc., that corresponds to a target rotation speed of a motor 500 and a temperature signal from a thermistor that corresponds to a temperature around the CPU are input to a reference voltage circuit 700, and outputs a reference voltage corresponding to the speed control signal and the temperature signal. An FG (Frequency Generator) signal corresponding to the rotation speed of the motor 500 is input to a speed voltage output circuit 701, and outputs a speed voltage corresponding to the FG signal. A comparison circuit 702 compares the reference voltage with the speed voltage to output a drive signal as a comparison result. A motor driving circuit 703 drives the motor 500 based on the drive signal so that the speed voltage matches the reference voltage.

FIG. 17 depicts the relation of the rotation speed of the motor 500 in the motor speed control circuit 600 in FIG. 16, the speed control signal, and the temperature, which is obtained on the basis of an embodiment disclosed in Japanese Patent Application Laid-Open Publication No. 2007-68344. In FIG. 17, T1 to T3 denote temperatures that have a relation of T1<T2<T3. The speed control signal input to the motor speed control circuit 600 is a PWM (Pulse Wide Modulation) signal, and the rotation speed of the motor 500 increases according to the duty ratio of the H level (high level) of the PWM signal. The motor control circuit 600 feeds back the FG signal corresponding to the rotation speed of the motor 500 to generate the speed voltage, and compares the speed voltage with the reference voltage. As a result, the rotation speed of the motor changes linearly relative to the duty ratio of the H level of the PWM signal. Even when the duty ratio of the H level of the PWM signal is constant, the rotation speed of the motor increases as a temperature rises.

A recent fan motor, however, requires such operation that the rotation speed of the motor is changed linearly relative to the speed control signal and is changed according to a temperature, and that the rotation speed of the motor is minimized regardless of a temperature when the speed control signal is input so as to minimize the rotation speed of the motor. According to the motor speed control circuit 600 of FIG. 16, however, even when the PWM signal is input so as to minimize the rotation speed, the rotation speed of the motor 500 changes as a temperature changes, as shown in FIG. 17.

SUMMARY OF THE INVENTION

A motor speed control circuit according to an aspect of the present invention includes: a voltage generating circuit configured to change either a reference voltage corresponding to a target rotation speed of a motor or a speed voltage corresponding to a rotation speed of the motor, according to a temperature, and output the reference voltage and the speed voltage, either one of which is changed; a comparison circuit configured to compare the speed voltage output from the voltage generating circuit with the reference voltage output from the voltage generating circuit; and a driving circuit configured to drive the motor so as to match a level of the speed voltage to a level of the reference voltage, based on a comparison result from the comparison circuit.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

First Embodiment

Figure 1:
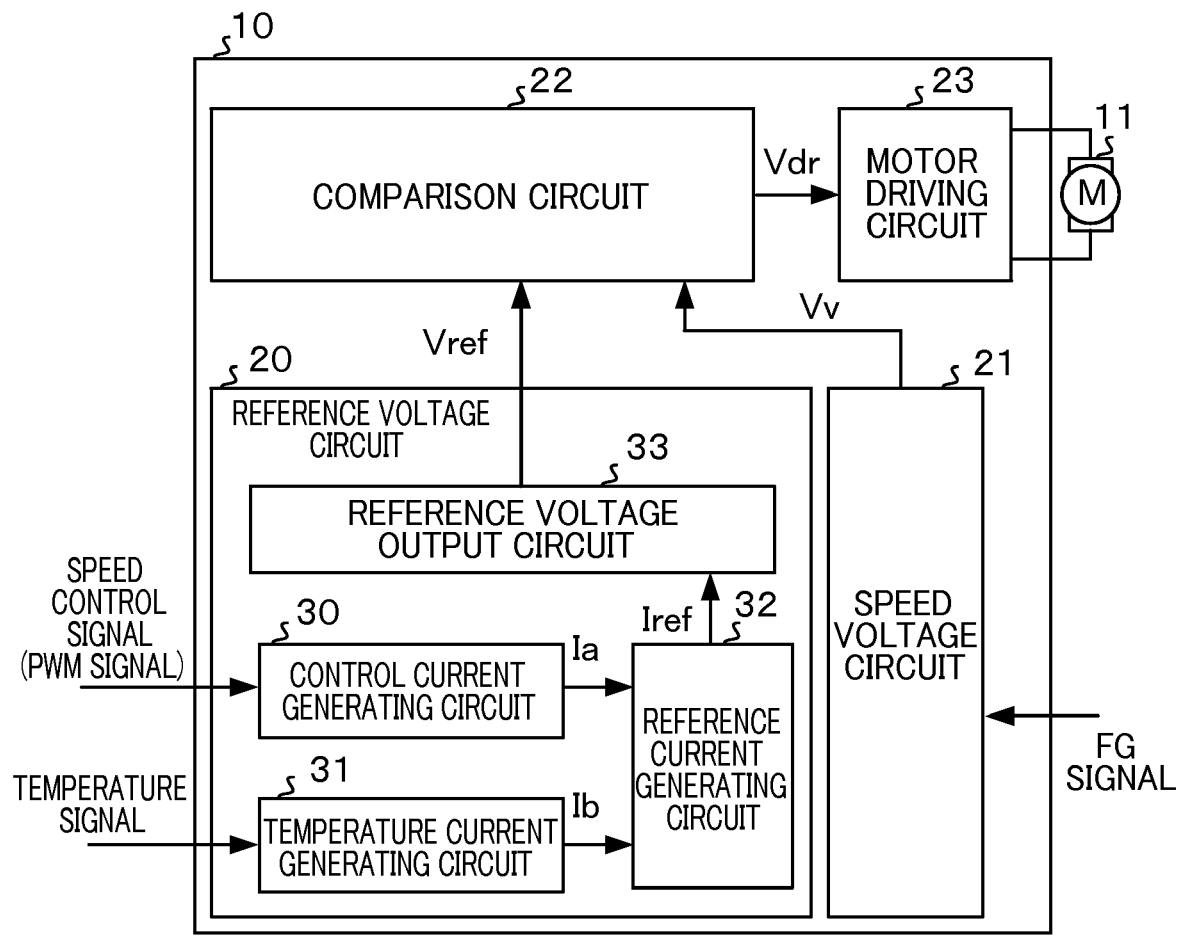
FIG. 1 is a diagram showing the configuration of a motor speed control circuit 10 of a first embodiment of the present invention.
Figure 2:
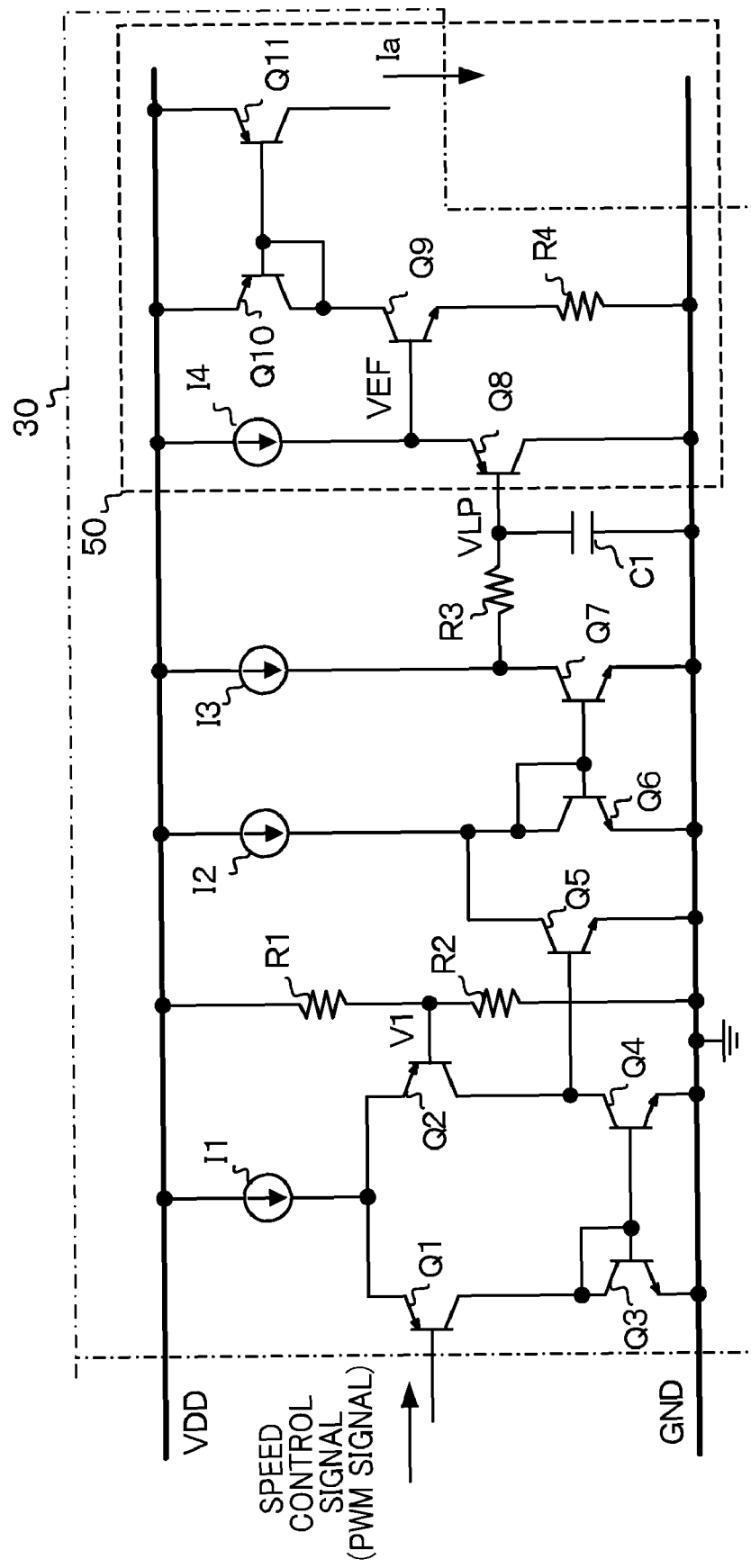
FIG. 2 is a diagram showing one embodiment of a control current generating circuit 30.
Figure 3:
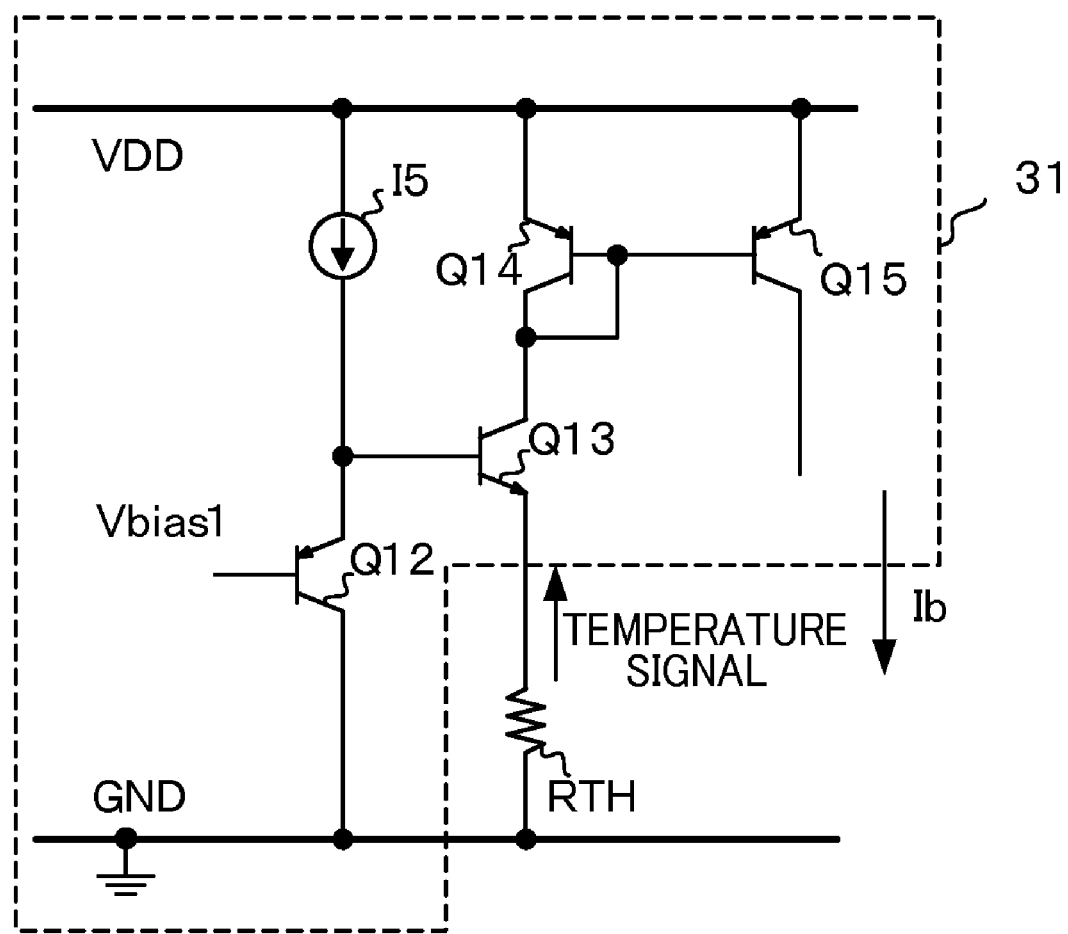
FIG. 3 is a diagram showing one embodiment of a temperature current generating circuit 31 to which a thermistor RTH is connected.
Figure 4:
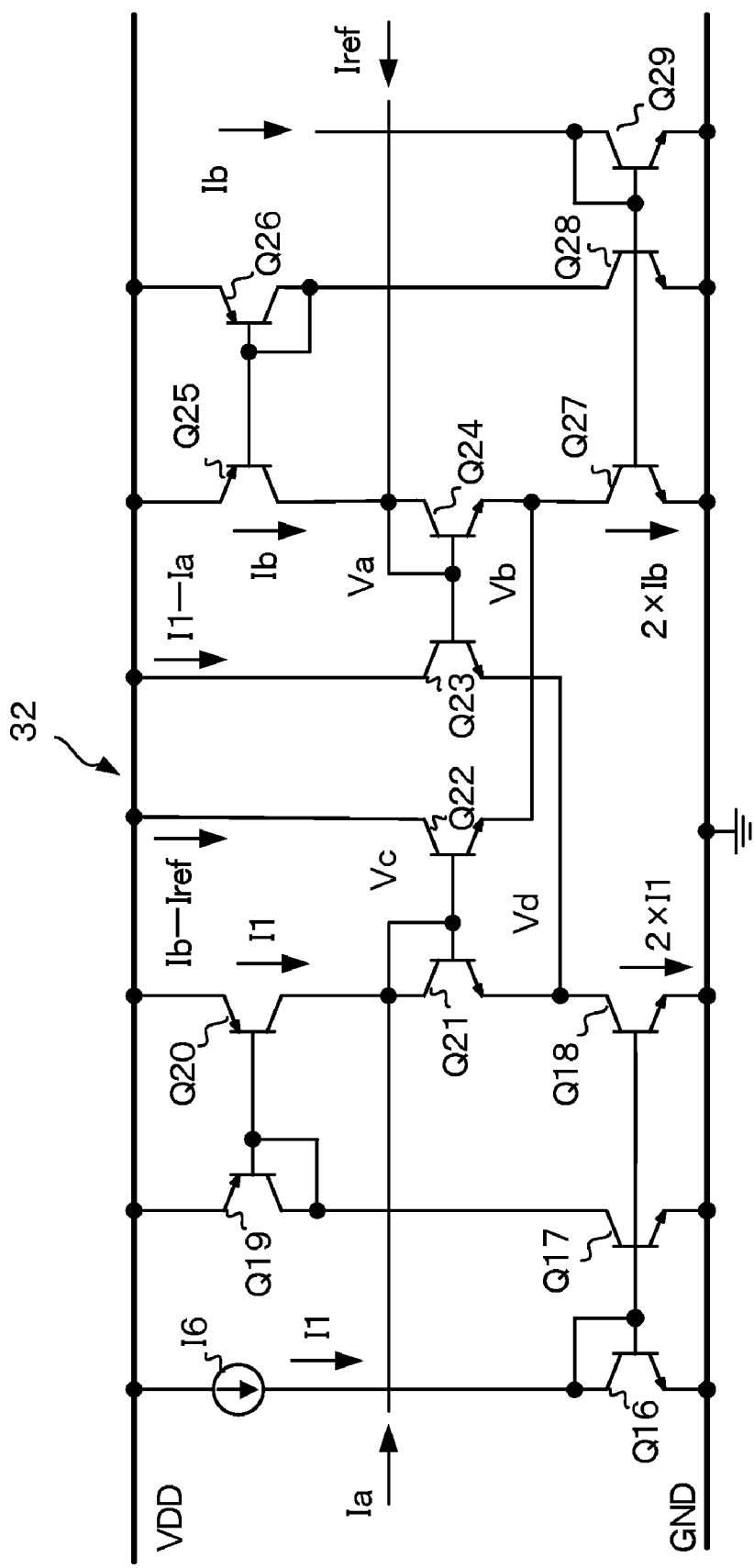
FIG. 4 is a diagram showing one embodiment of a reference current generating circuit 32.
Figure 5:
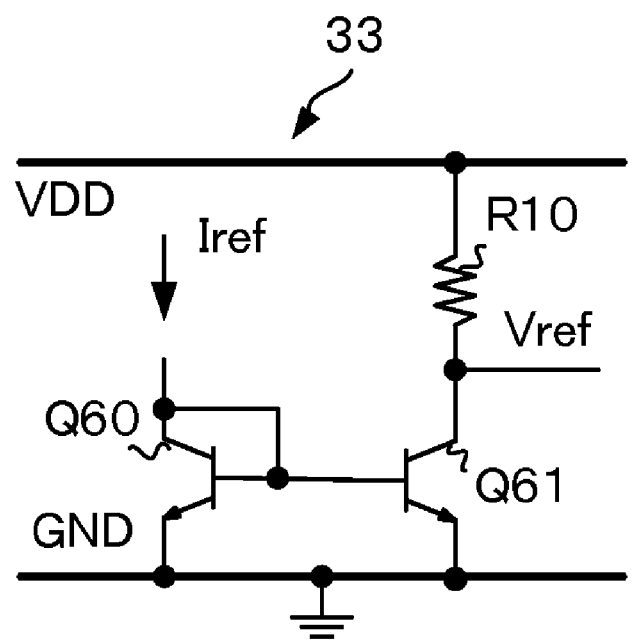
FIG. 5 is a diagram showing one embodiment of a reference voltage output circuit 33.
Figure 6:
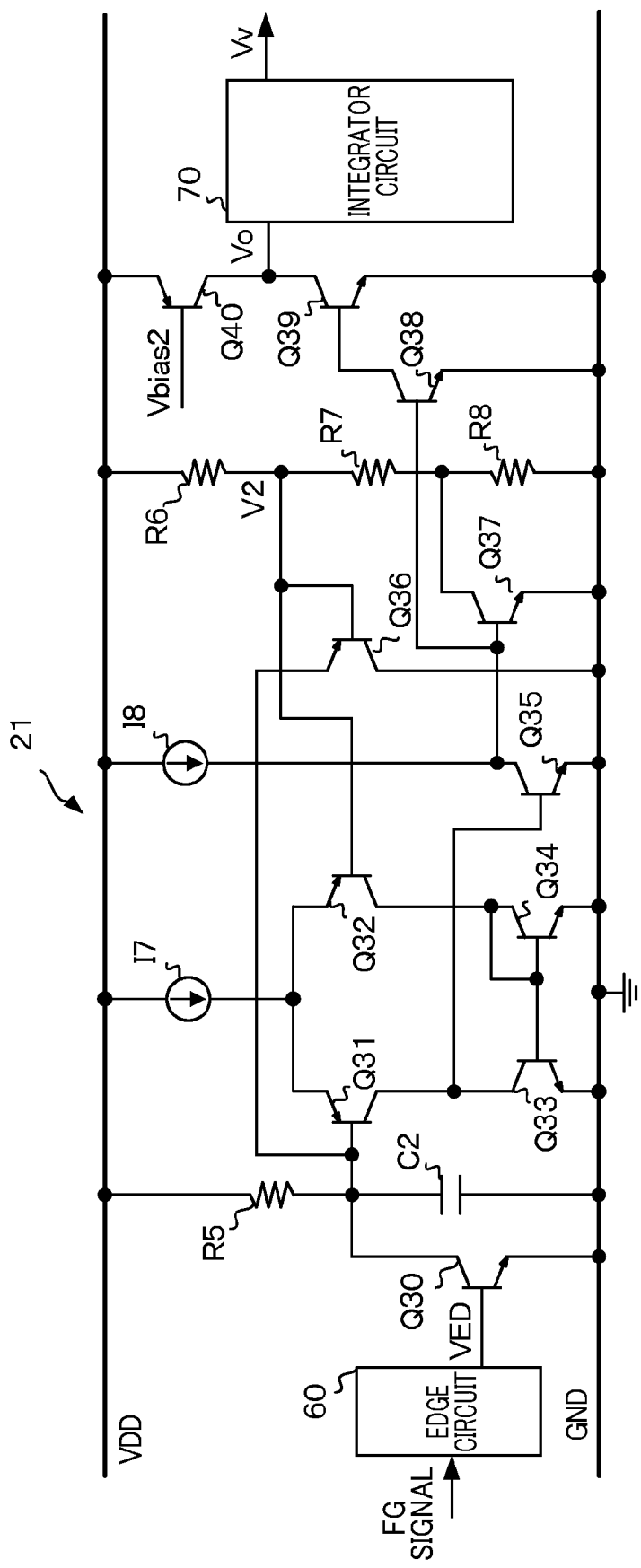
FIG. 6 is a diagram showing one embodiment of a speed voltage circuit 21.
Figure 7:
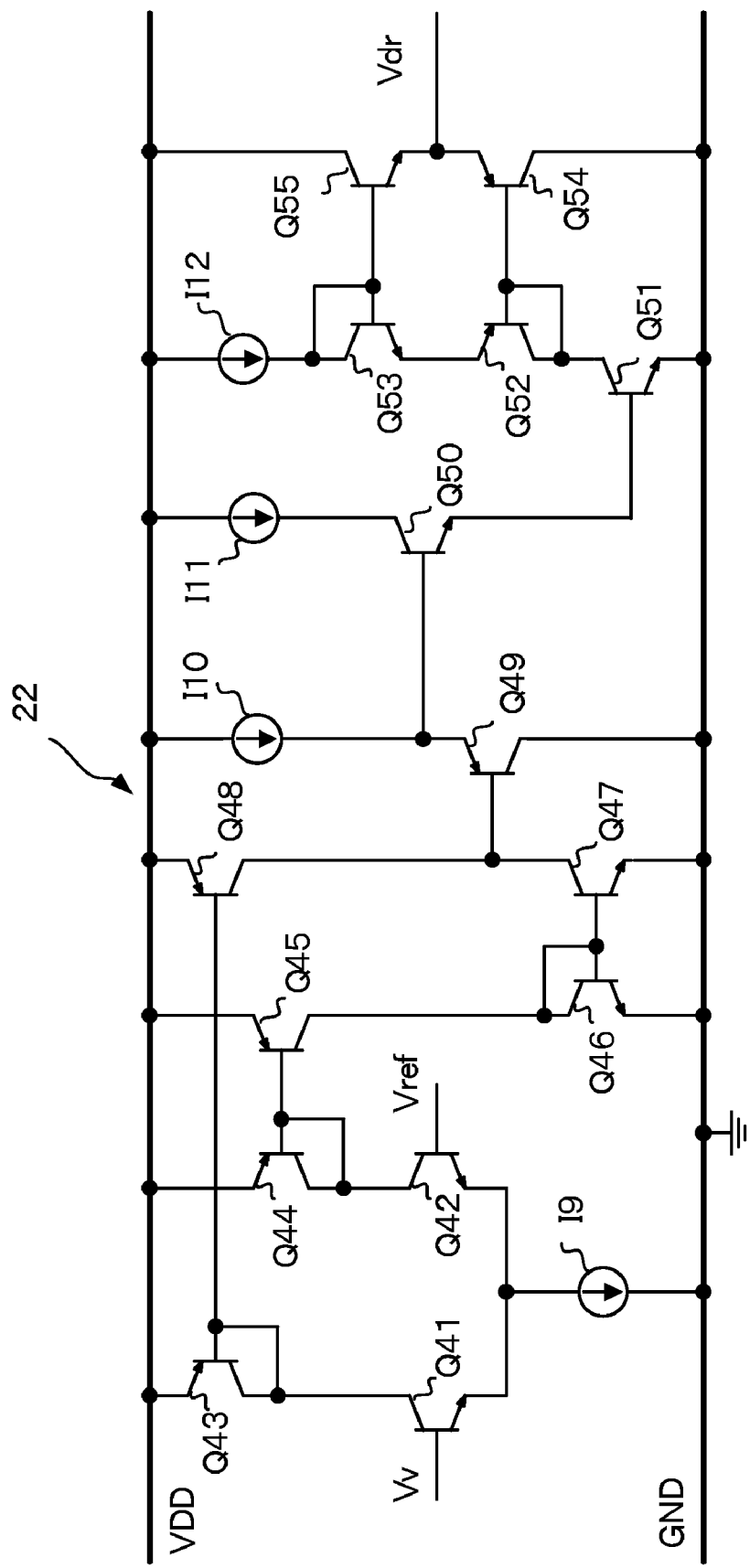
FIG. 7 is a diagram showing one embodiment of a comparison circuit 22.

FIG. 1 depicts the configuration of a motor speed control circuit 10 of a first embodiment of the present invention. FIG. 2 depicts one embodiment of a control current generating circuit 30. FIG. 3 depicts one embodiment of a temperature current generating circuit 31 to which a thermistor RTH is connected. FIG. 4 depicts one embodiment of a reference current generating circuit 32. FIG. 5 depicts one embodiment of a reference voltage output circuit 33. FIG. 6 depicts one embodiment of a speed voltage circuit 21. FIG. 7 depicts one embodiment of a comparison circuit 22.

The motor speed control circuit 10 of the first embodiment will be described with reference to FIGS. 1 to 7.

The motor speed control circuit 10 is a circuit that controls the rotation speed of a motor 11 based on a speed control signal corresponding to a target rotation speed of the motor 11 that is input from a microcomputer, a temperature signal corresponding to a temperature, and an FG signal having a frequency corresponding to an actual rotation speed of the motor 11. As shown in FIG. 1, the motor speed control circuit 10 is constituted of a reference voltage circuit 20, a speed voltage circuit 21, a comparison circuit 22, and a motor driving circuit 23. The reference voltage circuit 20 and the speed voltage circuit 21 correspond to a voltage generating circuit of the present invention.

The motor 11 is a motor that rotates a fan for cooling a CPU etc., and a rotary motor etc. can be employed as the motor 11.

The reference voltage circuit 20 is a circuit that receives the speed control signal and the temperature signal, and outputs a reference voltage Vref corresponding to the product of the target rotation speed and a temperature. As shown in FIG. 1, the reference voltage circuit 20 constitute of a control current generating circuit 30 (first current generating circuit), a temperature current generating circuit 31 (second current generating circuit), a reference current generating circuit 32 (third current generating circuit), and a reference voltage output circuit 33 (current-to-voltage conversion circuit).

Firstly, the outline of each of circuits constituting the motor speed control circuit 10 shown in FIG. 1 will be described. The control current generating circuit 30 is a circuit that receives speed control signal, and outputs a control current Ia (first current) corresponding to the target rotation speed. In the first embodiment of the present invention, the input speed control signal is a PWM signal. At the control current generating circuit 30, the output control current Ia increases as the duty ratio of an H level (high level) of the PWM signal increases, and, contrary to that, the output control current Ia decreases as the duty ratio of the H level of the PWM signal decreases. The temperature current generating circuit 31 is a circuit that receives the temperature signal, and outputs a temperature current Ib (second current) corresponding to a temperature. The temperature current Ib increases with a temperature increase, and decreases with a temperature decreases. The reference current generating circuit 32 is a circuit that outputs a reference current Iref (third current) that corresponds to the product of the control current Ia and the temperature current Ib. The reference voltage output circuit 33 is a circuit that converts the reference current Iref to the reference voltage Vref. An increase in the reference current Iref results in a decrease in the reference voltage Vref, and a decrease in the reference current Iref results in an increase in the reference voltage Vref. The speed voltage circuit 21 is a circuit that outputs a speed voltage Vv corresponding to the FG signal. The higher rotation speed of the motor 11 results in a decrease in the speed voltage Vv, and the lower rotation speed of the motor 11 results in an increase in the speed voltage Vv. The comparison circuit 22 is a circuit that compares the reference voltage Vref with the speed voltage Vv, and outputs a drive signal Vdr as a comparison result. The motor driving circuit 23 is a circuit that drives the motor 11 according to the drive signal Vdr. In the present specification, the motor speed control circuit 10 operates in an acceleration control state of accelerating the motor 11 when the speed voltage Vv is higher than the reference voltage Vref, while operates in a deceleration control state of decelerating the motor 11 when the speed voltage Vv is lower than the reference voltage Vref.

The motor speed control circuit 10 having the above mentioned configuration controls the speed voltage so that the speed voltage Vv matches the reference voltage Vref.

As shown in FIG. 2, the control current generating circuit 30 is constituted of PNP transistors Q1, Q2, Q8, Q10, and Q11, NPN transistors Q3 to Q7 and Q9, resistors R1 to R4, a capacitor C1, and bias current sources I1 to I4. The PNP transistors Q8, Q10, and Q11, the NPN transistor Q9, the resistor R4, and the bias current source I4 constitute a voltage-to-current conversion circuit 50.

As shown in FIG. 3 the temperature current generating circuit 31 is constituted of PNP transistors Q12, Q14 (current-to-voltage conversion element) and Q15 (first transistor), an NPN transistor Q13 (second transistor), and a bias current source I5. A resistor shown in FIG. 3 is a thermistor RTH, whose one end is connected to the emitter electrode of the NPN transistor Q13. The NPN transistor Q13 and the PNP transistor Q14 correspond to a voltage output circuit of the present invention.

As shown in FIG. 4 the reference current generating circuit 32 is constituted of PNP transistors Q19, Q20, Q25, and Q26, NPN transistors Q16 to Q18, Q21 to Q24, and Q27 to Q29, and a bias current source I6.

As shown in FIG. 5 the reference voltage output circuit 33 is constituted of NPN transistors Q60 and Q61, and a resistance R10.

As shown in FIG. 6 the speed voltage circuit 21 is constituted of PNP transistors Q31, Q32, Q36, and Q40, NPN transistors Q30, Q33 to Q35, and Q37 to Q39, resistors R5 to R8, a capacitor C2, bias current sources I7 and I8, an edge circuit 60, and an integrator circuit 70.

As shown in FIG. 7 the comparison circuit 22 is constituted of PNP transistors Q43 to Q45, Q48, Q49, Q52, and Q54, NPN transistors Q41, Q42, Q46, Q47, Q50, Q51, Q53, and Q55, and bias current sources I9 and I12.

The motor driving circuit 23, of which an embodiment is not described in the present specification, may employ, for example, an H bridge circuit.

The description will be made of the case where the PWM signal as the speed control signal from a microcomputer etc.

is input to the motor speed control circuit 10 under a predetermined temperature Ta, and where the motor 11 rotates at a rotation speed corresponding to the predetermined temperature Ta and the duty ratio of the H level of the PWM signal.

As shown in FIG. 2 in the control current generating circuit 30, the PNP transistors Q1 and Q2, the NPN transistors Q3 and Q4, and the bias current source I1 constitute a comparator, where the base electrode of the PNP transistor Q1 corresponds to the non-inverting input and the base electrode of the PNP transistor Q2 corresponds to the inverting input.

A divided voltage V1 obtained by dividing the voltage by the resistors R1 and R2 connected in series between a power supply VDD and a ground GND is applied to the base electrode of the PNP transistor Q2.

When the H level pulse of the PWM signal is input to the base electrode of the PNP transistor Q1, that is, when the potential of the base electrode of the PNP transistor Q1 is higher than the divided voltage V1, the potential at the corrector electrode of the NPN transistor Q4 becomes H level, and thereby turning on the NPN transistor Q5. As a result of turning on the NPN transistor Q5, the bias current from the bias current source I2 flows to the NPN transistor Q5, and the NPN transistor Q7 is turned off. In consequence, a bias current from the bias current source I3 flows to the capacitor C1 through the resistor R3.

On the other hand, when the L level (low level) pulse of the PWM signal is input to the PNP transistor Q1, that is, when a potential at the base electrode of the PNP transistor Q1 is lower than the divided voltage V1, the operation is opposite to the above described operation and turn on the NPN transistor Q7. Therefore the bias current from the bias current source I3 and electric charges accumulated in the capacitor C1 when the PMW signal is at H level, flow to the ground GND.

The resistor R3 and the capacitor C1 constitute an LPF (Low Pass Filter) that smoothes a voltage input to the LPF, namely, a voltage at the corrector electrode of the NPN transistor Q7 that changes in response to the turning-on and turning-off of the NPN transistor Q7. As a result, a voltage VLP smoothed by the LPF is applied to the base electrode of the PNP transistor Q8 in the voltage-to-current conversion circuit 50. This smoothed voltage VLP increases when the duty ratio of the H level of the PWM signal is large, and decreases when the duty ratio of the H level of the PWM signal is small. The PNP transistor Q8 and the bias current source I4 constitute an emitter follower. Therefore, a voltage VEF corresponding to the voltage VLP applied to the base electrode of the PNP transistor Q8 is output from the emitter electrode of the PNP transistor Q8. Since the resistor R4 correspond to the emitter resistor of the NPN transistor Q9, a current corresponding to the voltage VEF applied to the base electrode of the NPN transistor Q9 flows to the resistor R4. The PNP transistors Q10 and Q11 constitute a current mirror circuit, so that the control current Ia corresponding to the current at the resistor R4 is output from the PNP transistor Q11. Thus, at the control current generating circuit 30, the control current Ia increases according to the increase in the duty ratio of the H level of the input PWM signal, and, contrary to that, decreases according to the decrease in the duty ratio of high pulses of the input PWM signal.

As shown in FIG. 3, the thermistor RTH is connected to the temperature current generating circuit 31, and the temperature current generating circuit 31 and the thermistor RTH are configured in the same manner as the voltage-to-current conversion circuit 50 in the control current generating circuit 30. Specifically, the PNP transistors Q12, Q14, and Q15, the NPN transistors Q13, the thermistor RTH, and the bias current source I5 correspond to the PNP transistors Q8, Q10, and Q11, the NPN transistors Q9, the resistor R5, and the bias current source I4, respectively. Here, when the bias voltage Vbias1 applied to the base electrode of the PNP transistor Q12 is considered as a bandgap reference voltage etc. whose amplitude varies in a small range depending on variations in temperature, a current that is based on the resistance of the thermistor RTH (Ta) and corresponds to the temperature Ta, flows to the thermistor RTH. As a result, a voltage signal VTH (Ta) generated on the thermistor RTH is input as the temperature signal to the temperature current generating circuit 31. When the temperature coefficient of the thermistor RTH of the first embodiment is considered as negative, the temperature current Ib increases with a temperature increase, and decreases with a temperature decrease.

As shown in FIG. 4, at the reference current generating circuit 32, the control current Ia is supplied to the base electrode of the diode-connected NPN transistor Q21, the temperature current Ib is supplied to the base electrode of the diode-connected NPN transistor Q29, and a bias current I1 from the bias current source I6 is supplied to the base electrode of the diode-connected NPN transistor Q16. As a result, the reference current Iref flows to the base electrode of the diode-connected NPN transistor Q24.

Firstly, description will be made about transistors through which current corresponding to the bias current I1 and the control current Ia flows, among the transistors constituting the reference current generating circuit 32. The bias current I1 flows to the NPN transistor Q16. The base electrodes of the transistors Q16, Q17, and Q18 are connected to each other so that above-mentioned transistors constitute a current mirror circuit. The NPN transistor Q17 has the same size as that of the NPN transistor Q16, and the NPN transistor Q18 is twice as large in size as the NPN transistor Q16. In this case, the current I1 flows through the NPN transistor Q17, while a current equivalent to 2×I1 flows through the NPN transistor Q18. The NPN transistors Q19 and Q20 constitute a current mirror circuit at the same size ratio, so that the current I1 flows through the NPN transistors Q20. Since the control current Ia and the current I1 flow to the transistor Q21, a current equivalent to Ia+I1 flows through the transistor Q21. The current of 2×I1 flows through the NPN transistor Q18 and the current of Ia+I1 flows through the transistor Q21 create a current of I1−Ia that flows through the NPN transistor 23.

Secondary, description will be made about transistors through which current corresponding to the temperature current Ib and the reference current Iref flow. The NPN transistors Q22, Q24, Q27, Q28, and Q29 correspond to the NPN transistors Q23, Q21, Q18, Q17, and Q16, respectively, and the PNP transistors Q25 and Q26 correspond to the PNP transistors Q20 and Q19, respectively. Therefore, the current Ib flows through the PNP transistor Q25, a current equivalent to Ib+Iref flows through the NPN transistor Q24, a current equivalent to 2×Ib flows through the NPN transistor Q27, and a current equivalent to Ib-Iref flows through the NPN transistor Q22.

Considering the potential at the base electrode of the NPN transistor Q24 and the potential at the emitter electrode of the NPN transistor Q24 as Va and Vb respectively, and the potential at the base electrode of the NPN transistor Q21 and the potential at the emitter electrode of the NPN transistor Q21 as Vc and Vd respectively, description will be made about the relation between current flowing through transistors and voltage at the transistors resulted from the respective potentials. A potential difference Vab between the potential Vb that is a reference potential and the potential Va is given as a potential difference between the base electrode and the emitter electrode of the NPN transistor Q24. The voltage Vab is, therefore, expressed by a current flowing through the NPN transistor Q24, thus represented by the equation: $Vab=VT \times \ln((Ib+Iref)/Is)$, where VT denotes a thermal voltage, and Is denotes a reverse saturation current. Likewise, a voltage Vad is expressed by a current flowing through the NPN transistor Q23, thus represented by the equation: $Vad=VT \times \ln((Il-Ia)/Is)$, a voltage Vcd is expressed by a current flowing through the NPN transistor Q21, thus represented by the equation: $Vcd=VT \times \ln((Il+Ia)/Is)$, and a voltage Vcb is expressed by a current flowing through the NPN transistor Q22, thus represented by the equation: $Vcb=VT \times \ln((Ib-Iref)/Is)$. The voltage Vab is equivalent to the sum of the voltages Vad, Vdc, and Vcb that is given by the equation: $Vab=Vad+Vdc+Vcb$. From these equations, the relation of the voltages can be expressed by the relation of the currents, which gives the equation: $\ln(Ib+Iref)=\ln(Il-Ia)-\ln(Il+Ia)+\ln(Ib-Iref)$. This equation is reduced to $Iref=((Ia \times Ib)/Il)$, which indicates that the reference current generating circuit 32 can generate the reference current Iref that is proportional to the production of the control current Ia and the temperature current Ib.

As shown in FIG. 5, the reference voltage output circuit 33 is supplied with a current having a current value Iref as a result of mirroring the reference current Iref generated in the reference current generating circuit 32 through, for example, a current mirror circuit (not shown) composed of transistors that are the same in size ratio. When the current having the current value Iref is input to the corrector electrode of the diode-connected NPN transistor 60, the same current having the current value Iref flows through the NPN transistor Q61 because the NPN transistors Q60 and Q61 constitute a current mirror circuit having the same size. As a result, a reference voltage Vref corresponds to the current value Iref and a resistance Rref is output to a node at which one end of the resistor R10 having the resistance value Rref is connected to the corrector electrode of the NPN transistor Q61. This reference voltage Vref is represented by the equation: $Vref=VDD-Iref \times Rref$.

Figure 8:
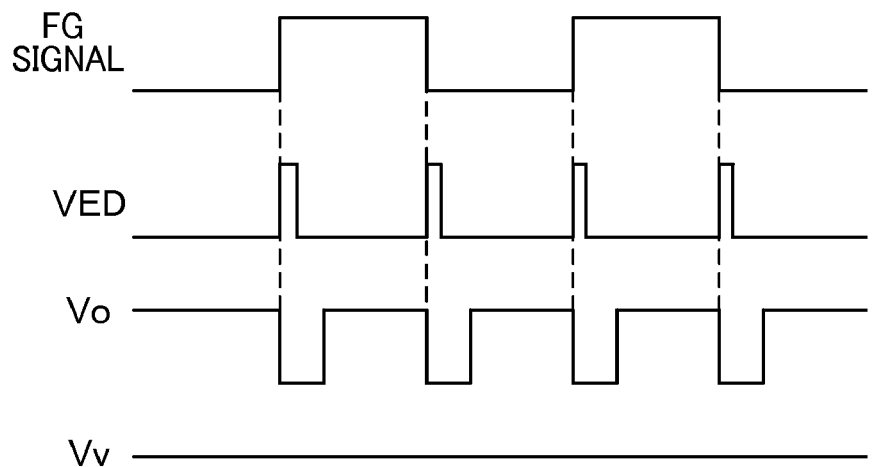
FIG. 8 is a diagram showing the waveforms of primary signals at the speed voltage circuit 21.

The edge circuit 60 in the speed voltage circuit 21 shown in FIG. 6 detects the edge of an input pulse signal and turns an output edge signal VED to a short pulse. FIG. 8 is a waveform chart of primary signals at the speed voltage circuit 21, and will be referred to when appropriate.

When the edge circuit 60 is input with the FG signal, the edge signal VED is changed to the short pulse at the edge of the FG signal, as described above. With the edge signal VED being input to the base electrode of the NPN transistor Q30, the NPN transistor Q30 is turned on or off depending on the level of the edge signal.

When the edge signal VED is at L level, the NPN transistor Q30 is turned off and the capacitor C2 is charged. The PNP transistor Q31 and Q32, the NPN transistors Q33 and Q34, and the bias current source I3 make up a comparator. When the capacitor C2 is charged and thereby the potential at the base electrode of the PNP transistor Q31 becomes higher than a divided voltage V2 at the resistors R6 to R8 connected in series between the power supply VDD and the ground GND, the potential at the collector electrode of the NPN transistor Q33 becomes L level. Accordingly, the NPN transistor Q35 is turned off, the NPN transistor Q38 is turned on, and the NPN transistor Q39 is turned off. The base electrode of the PNP transistor Q40 is supplied with a bias voltage Vbias2 that turns on the PNP transistor Q40. Therefore, an output voltage Vo becomes H level.

On the other hand, when the edge signal VED is at H level, the operation is opposite to the above described operation and finally the NPN transistor Q39 is tuned on. The on-resistance of the PNP transistor Q40 is determined in circuit design to be greater than the on-resistance of the PNP transistor Q39. Therefore, the output voltage Vo becomes L level. The width within which the output voltage Vo is at L level is determined by a time constant of the resistor R5 and the capacitor C2. Therefore, even when the rotation speed of the fan motor 11 changes, the width within which the output voltage Vo is at L level is constant if the time constant is fixed. However, the period of the output voltage Vo changes depending on the rotation speed of the motor 11 that is the period of the edge signal VED. For this reason, the width of the L level within one period of the output voltage Vo becomes large when the rotation speed of the motor 11 is high and the width of the L level within one period of the output voltage Vo becomes small when the rotation speed of the motor 11 is low. The integrator circuit 70 integrates the output voltage Vo, thereby outputting the speed voltage Vv corresponding to the H level of the output voltage Vo. Therefore, the speed voltage Vv decreases when the rotation speed of the motor 11 is high and increases when the rotation speed of the motor 11 is low.

As shown in FIG. 7, the reference voltage Vref and the speed voltage Vv are input to the comparison circuit 22. As described above, in the present specification, the motor 11 is put in the acceleration control state of accelerating the motor 11 when the speed voltage Vv is higher than the reference voltage Vref and is put in the deceleration control state of decelerating the motor 11 when the speed voltage Vv is lower than the reference voltage Vref. The operation of the comparison circuit 22 in the acceleration control state will first be described. The NPN transistors Q41, Q42, Q46, and Q47, the PNP transistors Q43, Q44, Q45, and Q48, and the bias current source I9 constitute a comparator. The base electrode of the NPN transistor Q41 corresponds to the non-inverting input of the comparator, and the base electrode of the NPN transistor Q42 corresponds to the inverting input of the comparator. Thus, in the acceleration control state, the NPN transistor Q49 turns off, the NPN transistor Q50 turns on, and the NPN transistor Q51 turns on. The bias current source I12 is set so that the turning-on of the NPN transistor Q51 turns on the PNP transistor Q54 and turns off the NPN transistor Q55. Hence the drive signal Vdr becomes L level. On the other hand, in the deceleration control state, since the operation is opposite to that of the acceleration control state, the output voltage Vdr becomes H level finally. The motor driving circuit 23 drives the motor 11 to be accelerated when receiving the L level of the drive signal Vdr, and drives the motor 11 to be decelerated when receiving the H level of the drive signal Vdr.

Here, the FG signal in the acceleration control state will then be described. In the acceleration control state, with the rotation speed of the motor 11 is increased, the period of the pulse of the FG signal corresponding to the rotation speed of the motor 11 is shortened and the time period of the L level increases within the output voltage Vo.

As a result, the speed voltage Vv decreases so as to be matched to the reference voltage Vref. In the deceleration control state, on the contrary, with the rotation speed of the motor 11 being decelerated, the period of the pulse of the FG signal corresponding to the rotation speed of the fan motor is lengthened and the time period of the L level decreases within the output voltage Vo. As a result, the speed voltage Vv increases so as to be matched to the reference voltage Vref. As seen above, since the motor speed control circuit 10 feeds back the speed voltage Vv corresponding to the rotation speed of the motor 11 and controls the rotation speed of the motor 11 so that the speed voltage Vv matches the level of the reference voltage Vref. Therefore the rotation speed of the motor 11 has a linear relation with the reference voltage Vref and the duty ratio of the H level of the PWM signal.

Description will be made about the operation of the motor speed control circuit 10 in the case where the duty ratio of the H level of the PWM signal is zero under the predetermined temperature Ta.

Figure 9:
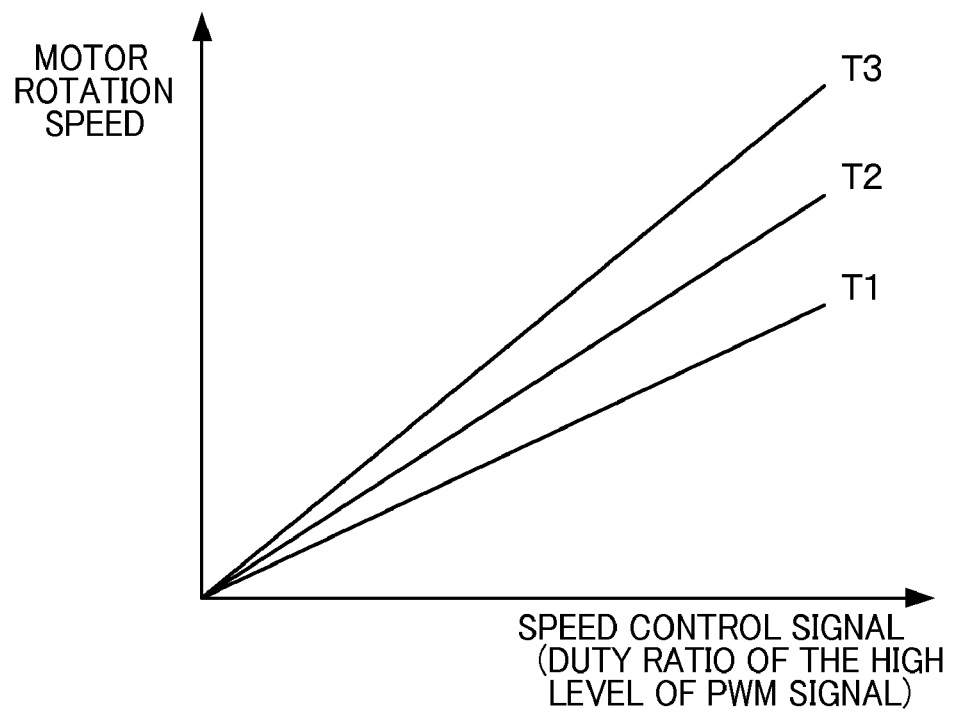
FIG. 9 is a diagram showing the relation between the rotation speed of a motor 11 and a speed control signal under different temperatures in the case where the motor 11 is driven by the motor speed control circuit 10 of the present invention.

FIG. 9 depicts the relation between the rotation speed of the motor 11 and the speed control signal under different temperatures in the case where the motor 11 is driven by the motor speed control circuit 10 of the present invention. FIG. 9 will be referred to when appropriate.

When the PWM signal whose duty ratio of the H level is zero is input to the control current generating circuit 30, the voltage at the base electrode of the transistor Q1 becomes L level. As a result, the voltage VLP smoothed by the LPF is reduced to substantially zero. Therefore the output VEF from the emitter follower circuit drops in response to the voltage VLP, the NPN transistor Q9 turns off, which reduces a current flowing through the resistor R4 to zero, thus reducing the control current Ia to zero. Since the reference current Iref is proportional to the product of the control current Ia and the temperature current Ib, the reference current Iref reduces to zero regardless of the value of the temperature current Ib. The reference voltage Vref is given by the equation: $Vref=VDD-Rref \times Iref$, so that zero reference current Iref makes the reference voltage Vref equal to the power supply VDD. At this time, the speed voltage Vv is lower than the reference voltage Vref, which puts the motor speed control circuit 10 into the deceleration control state. The motor speed control circuit 10, therefore, decelerates the motor 11 so as to match the speed voltage Vv to the reference voltage Vref. In order to set the speed voltage Vv to the power supply VDD, the H level pulses of the FG signal are required to be stopped, which as a consequence brings the motor 11 to be stopped. Thus, when the duty ratio of the H level of the PWM signal is zero, the rotation speed of the motor reduces to zero regardless of a temperature.

Description will be made about the operation of the motor speed control circuit 10 and of the motor 11 in the case where a temperature changes and where the duty ratio of high pulses of the PWM signal is a predetermined duty ratio. A temperature rise reduces the resistance value of the thermistor RTH, thus increasing the temperature current Ib. The reference current Iref, therefore, also increases, and the reference voltage Vref decreases. When the reference voltage Vref drops to be lower than the speed voltage Vv, the motor speed control circuit 10 gets into the acceleration control state, in which the motor driving circuit 23 accelerates the motor 11 so as to match the speed voltage Vv to the reference voltage Vref. A temperature drop, on the other hand, results in the opposite operation reverse to the above operation to ultimately decelerate the motor 11.

The motor speed control circuit 10 of the first embodiment having the above configuration changes the rotation speed of the motor 11 linearly relative to the duty ratio of the H level of the PWM signal and also changes the rotation speed of the motor 11 according to a temperature, and reduces the rotation speed of the motor 11 to zero regardless of a temperature when the PWM signal whose duty ratio of the H level is zero is input to stop the motor 11.

According to the invention of Japanese Patent Application Laid-Open Publication No. 2007-68344, a discrete resistor (hereinafter "series resistor") is connected to a thermistor, and a divided voltage generated by applying a voltage to the series resistor is input as a temperature signal to a motor speed control integrated circuit. In view of a reduction in the number of components, it is preferable to realize the series resistor in the motor speed control integrated circuit, however, it is difficult to control the resistance value and temperature coefficient of the resistor in the integrated circuit. Using a discrete component as the series resistor, therefore, becomes necessity. In the first embodiment, on the other hand, the thermistor RTH is connected to the emitter electrode of the NPN transistor Q13, and the voltage signal VTH (Ta) generated on the thermistor RTH is input as the temperature signal to the motor speed control circuit 10. As a result, according to the first embodiment, using only the thermistor RTH suffices for inputting the temperature signal, so that the number of components can be reduced compared to the above case.

For example, a PWM signal is used as the speed control signal in the first embodiment, but an analog signal may be used as the speed control signal. In such a case, by replacing the control current generating circuit 30 with the voltage-to-current conversion circuit 50 serving as the first current generating circuit of the present invention, and inputting analog signal to the PNP transistor Q8 of the voltage-to-current conversion circuit 50, it is possible to achieve the effects similar to those in the case of using the PWM signal as the speed control signal.

Second Embodiment

Figure 10:
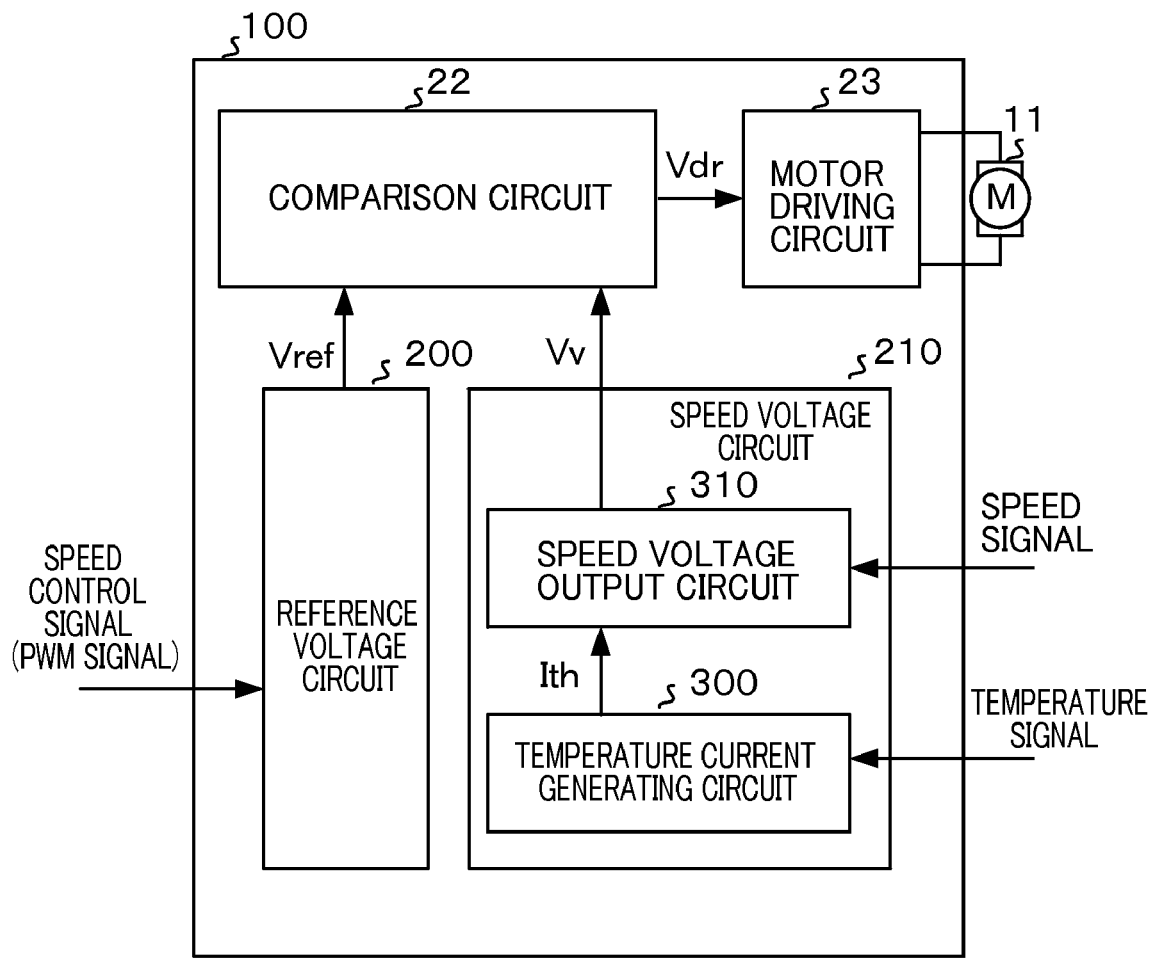
FIG. 10 is a diagram showing the configuration of a motor speed control circuit 100 of a second embodiment of the present invention.
Figure 11:
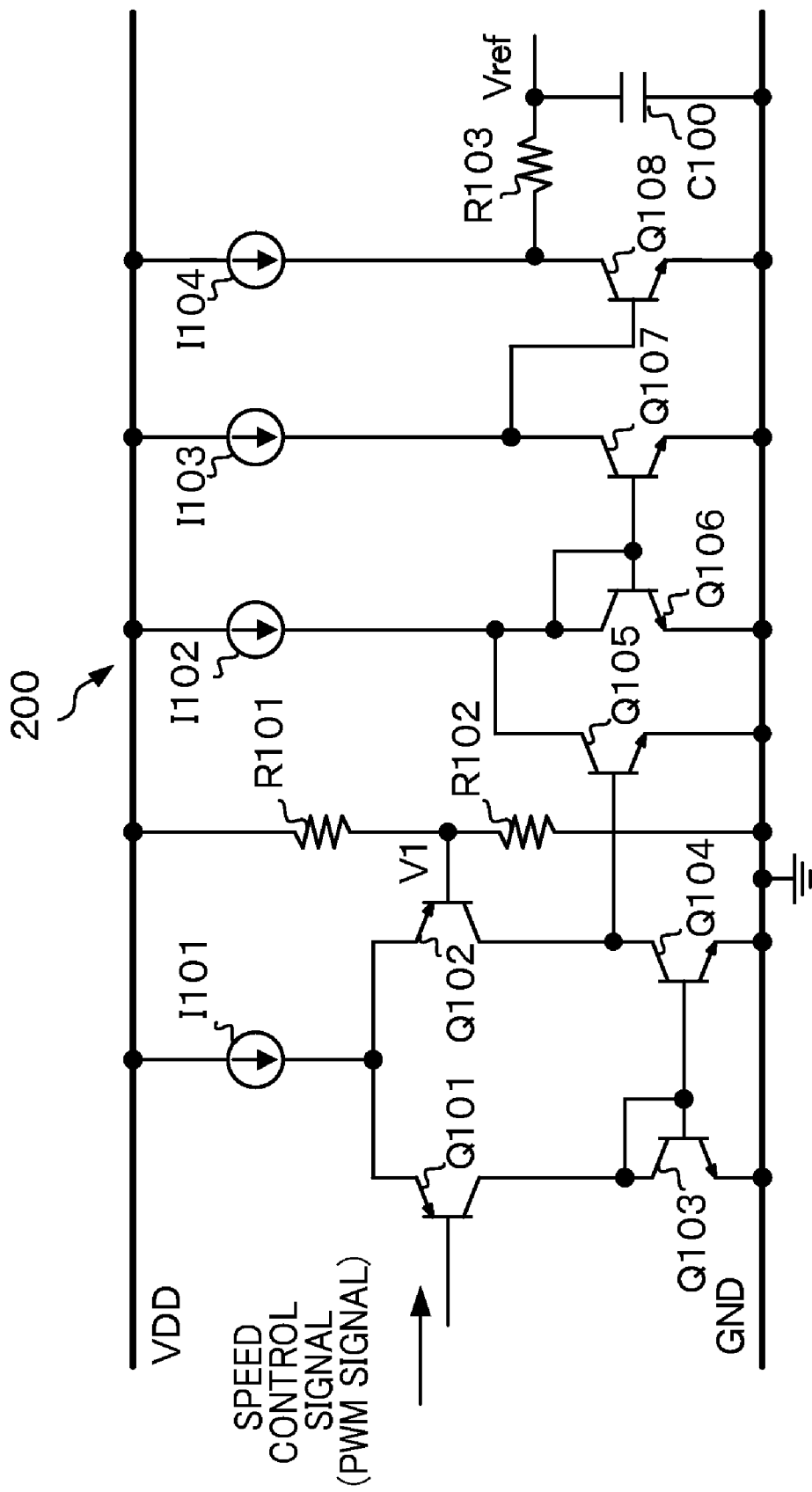
FIG. 11 is a diagram showing one embodiment of a reference voltage circuit 200.
Figure 12:
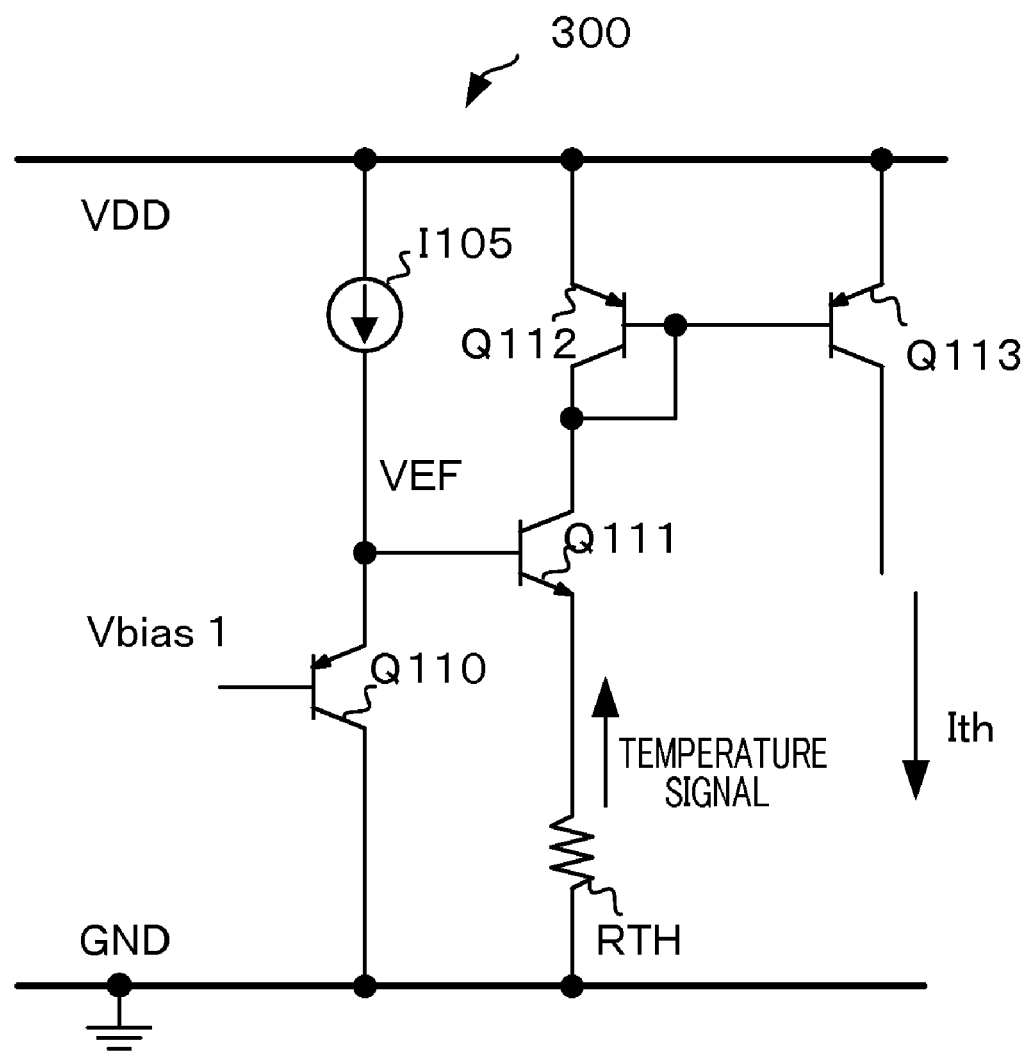
FIG. 12 is a diagram showing one embodiment of a temperature current generating circuit 300 to which the thermistor RTH is connected.
Figure 13:
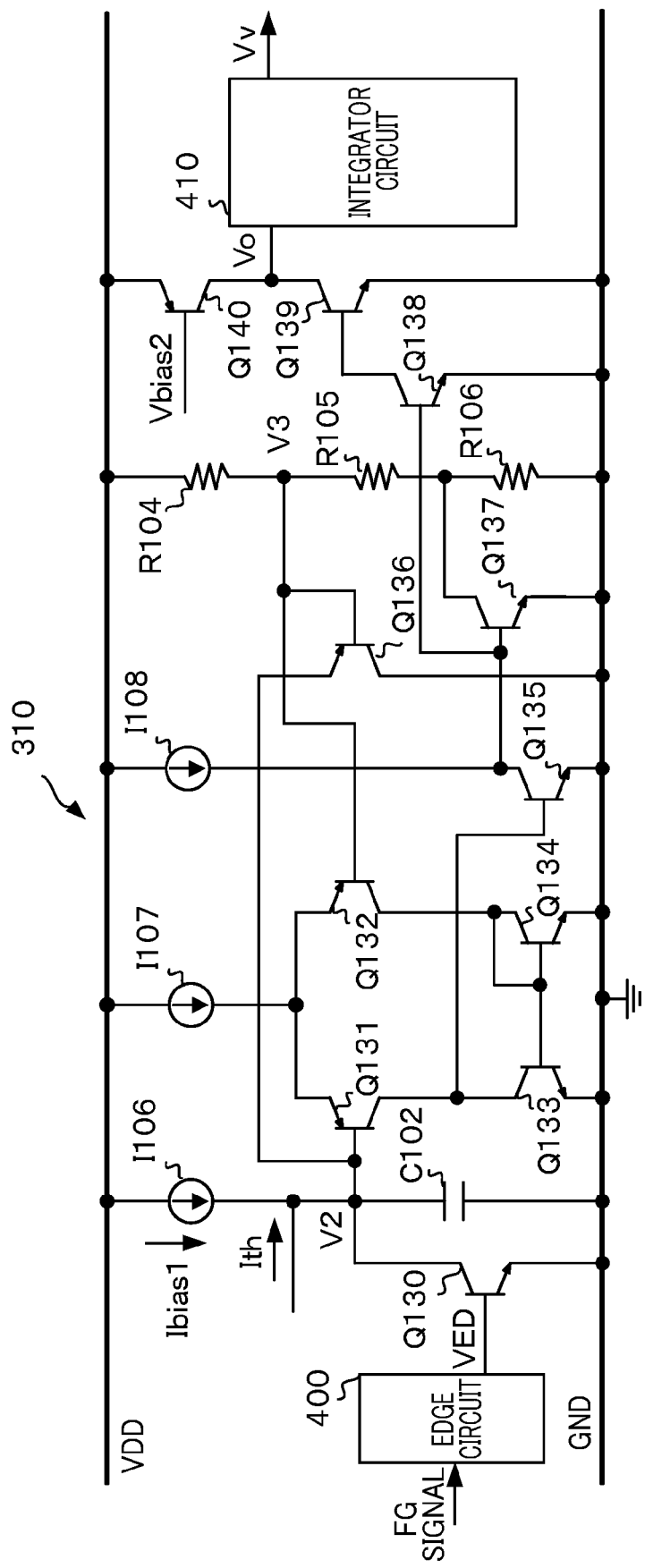
FIG. 13 is a diagram showing one embodiment of a speed voltage output circuit 310.

FIG. 10 depicts the configuration of a motor speed control circuit 100 of a second embodiment of the present invention. FIG. 11 depicts one embodiment of a reference voltage circuit 200. FIG. 12 depicts one embodiment of a temperature current generating circuit 300 to which the thermistor RTH is connected. FIG. 13 depicts one embodiment of a speed voltage output circuit 310. The motor speed control circuit 100 of the second embodiment will be described with reference to FIGS. 10 to 13.

The motor speed control circuit 100 is the circuit that controls the rotation speed of the motor 11 based on a speed control signal input from a microcomputer that corresponds to a target rotation speed of the motor 11, a temperature signal corresponding to a temperature, and a speed signal corresponding to an actual rotation speed of the motor 11. The motor speed control circuit 100 is constituted of a reference voltage circuit 200, a speed voltage circuit 210, the comparison circuit 22, and the motor driving circuit 23. The comparison circuit 22 and the motor driving circuit 23 of the motor speed control circuit 100 are the same as the comparison circuit 22 and the motor driving circuit 23 of the first embodiment. The reference voltage circuit 200 and the speed voltage circuit 210 correspond to the voltage generating circuit of the present invention.

The motor 11 is the motor that rotates a fan for cooling a CPU etc., and a rotary motor etc. can be employed as the motor 11.

The outline of each the circuits constituting the motor speed control circuit 100 of FIG. 10 will first be described. The reference voltage circuit 200 is the circuit that receives the speed control signal, and outputs a reference voltage Vref corresponding to the target rotation speed. In the second embodiment, the input speed control signal is a PWM signal. The reference voltage Vref drops when the duty ratio of the H level of the PWM signal is large, and rises when the duty ratio of the H level of the PWM signal is small. The speed voltage circuit 210 is the circuit that outputs a speed voltage Vv corresponding to the speed signal and the temperature signal, and is constituted by a temperature current generating circuit 300 and a speed voltage output circuit 310. In the second embodiment, the speed signal is an FG signal having a frequency corresponding to the rotation speed of the motor. The temperature current generating circuit 300 is the circuit that receives the temperature signal, and output a temperature current Ith corresponding to a temperature. The temperature current Ith increases with a temperature increase, and decreases with a temperature decreases. The speed voltage output circuit 310 is the circuit that outputs the speed voltage Vv corresponding to the product of the period of the FG signal and the temperature current Ith. The speed voltage Vv drops when the rotation speed of the motor 11 is high, and rises when the rotation speed of the motor 11 is low. The comparison circuit 22 is the circuit that compares the reference voltage Vref with the speed voltage Vv, and outputs a drive signal Vdr as a comparison result. The motor driving circuit 23 is the circuit that drives the motor 11 according to the drive signal Vdr. In the second embodiment, the motor speed control circuit 100 operates in an acceleration control state of accelerating the motor 11 when the speed voltage Vv is higher than the reference voltage Vref, while operates in a deceleration control state of decelerating the motor 11 when the speed voltage Vv is lower than the reference voltage Vref.

The motor speed control circuit 100 having the above configuration controls the speed voltage Vv so as to be matched to the reference voltage Vref.

As shown in FIG. 11, the reference voltage circuit 200 is constituted of PNP transistors Q101 and Q102, NPN transistors Q103 to Q108, resistors R101 to R103, a capacitor C100, and bias current sources I101 to I104.

As shown in FIG. 12, the temperature current generating circuit 300 is constituted of PNP transistors Q110, Q112 and Q113 (transistor), an NPN transistor Q111, and a bias current source I105. A resistor shown in FIG. 12 is the thermistor RTH, whose one end is connected to the emitter electrode of the NPN transistor Q111. The PNP transistor Q112 and the NPN transistor Q111 correspond to a temperature voltage output circuit of the present invention.

As shown in FIG. 13, the speed voltage output circuit 310 is constituted of PNP transistors Q131, Q132, Q136, and Q140, NPN transistors Q130, Q133 to Q135, and Q137 to Q139, resistors R104 to R106, a capacitor C102, bias current sources I106 to I108, an edge circuit 400, and an integrator circuit 410. The capacitor C102 corresponds to a capacitor of the present invention, and the edge circuit 400 and the NPN transistor Q130 correspond to a discharge circuit of the present invention.

The description will be made of the case where the PWM signal as the speed control signal from a microcomputer etc., is input to the motor speed control circuit 100 under a predetermined temperature Ta and the motor 11 rotates at a rotation speed that corresponds to the predetermined temperature Ta and the duty ratio of the H level of the PWM signal.

In the reference voltage circuit 200, the PNP transistors Q101 and Q102, the NPN transistors Q103 and Q104, and the bias current source I101 constitute a comparator, as shown in FIG. 11, where the base electrode of the PNP transistor Q101 corresponds to the non-inverting input and the base electrode of the PNP transistor Q102 corresponds to the inverting input. A divided voltage V1 obtained by dividing the voltage by the resistors R101 and R102 connected in series between the power supply VDD and the ground GND is applied to the base electrode of the PNP transistor Q102.

When the H level pulse of the PWM signal is input to the base electrode of the PNP transistor Q101, that is, when a potential at the base electrode of the PNP transistor Q101 is higher than the divided voltage V1, the potential at the corrector electrode of the NPN transistor Q104 becomes H level, and thereby turning on the NPN transistor Q105. By the turning-on of the NPN transistor Q105, the bias current from the bias current source I102 flows to the NPN transistor Q105, and thereby turning off the NPN transistor Q107 and turning on the NPN transistor Q108. As a result, a potential at a node that connects the resistor R103 to the capacitor C100 substantially reduces to zero.

When the L level pulse of the PWM signal is input to the base electrode of the PNP transistor Q101, that is, when a potential at the base electrode of the PNP transistor Q101 is lower than the divided voltage V1, the opposite operation to the above described operation occurs and NPN transistor Q108 turns off. This causes a bias current from the bias current source I104 flow to the capacitor C100, and thereby the capacitor C100 is charged.

The resistor R103 and the capacitor C100 constitute an LPF (Low Pass Filter), smoothing a voltage input to the LPF, namely, a voltage at the corrector electrode of the NPN transistor Q108 that changes in response to turning on and off of the NPN transistor Q108. As a result, the smoothed reference voltage Vref is output to the node at which the resistor R103 that is an output end of the LPF is connected to the capacitor C100. This reference voltage Vref drops when the duty ratio of the H level of the PWM signal is large, and rises when the duty ratio of H level of the PWM signal is small.

As shown in FIG. 12, in the temperature current generating circuit 300, the PNP transistor Q110 and the bias current source I105 constitute an emitter follower. Therefore, a voltage VEF corresponding to a bias voltage Vbias1 applied to the base electrode of the PNP transistor Q110 is output from the emitter electrode of the PNP transistor Q110. Here, when the bias voltage Vbias1 applied to the base electrode of the PNP transistor Q110 is considered as a bandgap reference voltage etc. whose amplitude varies in a small range depending on variations in temperature, the amplitude of the voltage VEF also varies in a small range depending on variations in temperature. The thermistor RTH is equivalent to the emitter resistor of the NPN transistor Q111. Since the voltage VEF is applied to the base electrode of the NPN transistor Q111, a current flow to the thermistor RTH is determined by the resistance value RTH (Ta) of the thermistor RTH corresponding to the temperature Ta. As a result, a voltage signal VTH (Ta) generated on the thermistor RTH is input as the temperature signal to the temperature current generating circuit 300. The PNP transistors Q112 and Q113 constitute a current mirror circuit. Therefore, a temperature current Ith corresponding to the current flowing to the thermistor RTH (Ta) is output from the PNP transistor Q113. When the temperature coefficient of the thermistor RTH of the second embodiment is considered as negative, the temperature current Ith increases with a temperature increase, and decreases with a temperature decrease.

Figure 14:
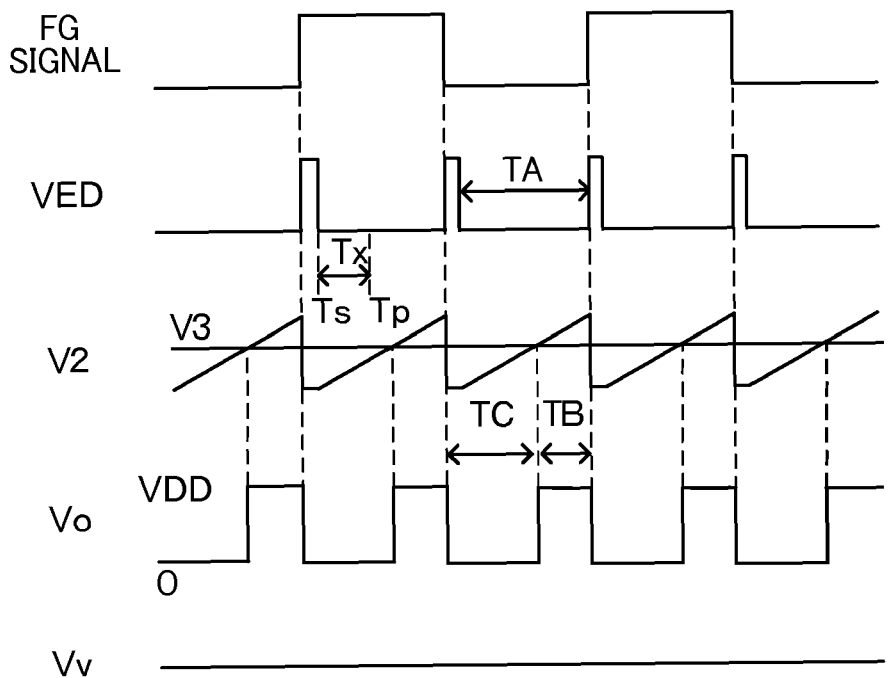
FIG. 14 is a diagram showing the waveforms of primary signals at the speed voltage output circuit 310.

As shown in FIG. 13, in the speed voltage output circuit 310, the temperature current Ith from the temperature current generating circuit 300 is supplied to a node that connects the bias current source I106 to the capacitor 102. The edge circuit 400 detects the edges of an input pulse signal and turns an output edge signal VED to a short pulse. FIG. 14 is a waveform chart of primary signals at the speed voltage output circuit 310, and will be referred to when appropriate.

When the edge circuit 400 is input with the FG signal, the edge signal VED is changed to the short pulse at the edge of the FG signal, as described above. With the edge signal VED being input to the base electrode of the NPN transistor Q130, the NPN transistor Q130 is turned on or off depending on the level of the edge signal.

When the edge signal VED is at the L level, the NPN transistor Q130 is off, so that the capacitor C102 is charged for a period TA with the current that is the sum of the temperature current Ith and the bias current Ibias1. By putting a node voltage at the node supplied with the temperature current Ith and the bias current Ibias1 as V2, the value of the bias current Ibias1 as Ibias1, and the capacitance of the capacitor C102 as C, the node voltage V2 at a time Tp after the passage of a period Tx from a time Ts at which the edge signal VED becomes L level is given by the equation: $V2(Tx)=((Ith+Ibias1) \times Tx)/C$. The description will be made of an operation that occurs when the node voltage V2 is higher than a divided voltage V3 created by the resistors R104 to R106 connected in series between the power supply VDD and the ground GND. A period TB is a period over which the node voltage V2 remains higher than the divided voltage V3. The PNP transistors Q131 and Q132, the NPN transistors Q133 and Q134, and the bias current source I107 constitute a comparator. Therefore a potential at the corrector electrode of the NPN transistor Q133 becomes L level. As a result, the NPN transistor Q135 turns off, the NPN transistor Q138 turns on, and the NPN transistor Q139 turns off. The base electrode of the PNP transistor Q140 is supplied with a bias voltage Vbias2 that turns on the PNP transistor Q140. Hence an output voltage Vo becomes H level. In the second embodiment, the H level of the voltage Vo is equal to the source voltage VDD. When the node voltage V2 is lower than the divided voltage V3, the operation is opposite to the above described operation, and the NPN transistor Q139 turns on in the end. The on-resistance of the NPN transistor Q140 is determined to be larger than that of the NPN transistor Q139, so that the output voltage Vo becomes L level. In the second embodiment, the L level of the voltage Vo is considered as zero voltage.

On the other hand, when the edge signal VED is high, the NPN transistor Q130 turns on and the node voltage V2 becomes lower than the divided voltage V3. As a result, the above described operation in the case of the node voltage V2 is lower than the divided voltage V3 occurs, and the output voltage Vo becomes L level in the end. A period TC indicates a period over which: the edge signal VED is at the H level; and the node voltage V2 is lower than the divided voltage V3 when the edge signal VED is at the L level.

According to the above description, assuming that a period over which the edge signal VED remains high is short enough to be ignored, the output voltage Vo has a period that is equivalent to the period TA. The output voltage Vo, therefore, is represented by the equation: $Vo=VDD \times (TB/TA)$. The periods TA, TB, and TC have the relation given by the equation: $TA=TB+TC$, and the divided voltage V3 and the period TC have the relation given by the equation: $V3=V2(TC)=((Ith+Ibias1) \times TC)/C$. These equations are reduced into the simplified equation representing the output voltage Vo: $Vo=VDD \times (1-(C \times V3)/(TA \times (Ith+Ibias1)))$. This equation indicates that the output voltage Vo is the voltage that corresponds to the product of the temperature current Ith and the period TA over which the edge signal VED remains the L level. Because the temperature current Ith changes according to a temperature, and the period TA over which the edge signal VED remains the L level changes according to the period of the FG signal, i.e., the rotation speed of the motor, the output voltage Vo is concluded to be a voltage that corresponds to the product of a temperature and the rotation speed of the motor. Since the temperature current Ith is constant under the predetermined temperature Ta, a width of the output voltage Vo become L level is constant. When the rotation speed of the motor 11 is high, the time period of the L level within one period of the output voltage Vo increases, and thereby lowering the output voltage Vo. When the rotation speed of the motor 11 is low, the time period of the L level within one period of the output voltage Vo decrease, and thereby rising the output voltage Vo. The integrator circuit 410 integrates the output voltage Vo to output the speed voltage Vv corresponding to the H level of the output voltage Vo. Thus, the speed voltage Vv drops when the rotation speed of the motor 11 is high, and rises when the rotation speed of the motor 11 is low.

As shown in FIG. 10, the reference voltage Vref and the speed voltage Vv are input to the comparison circuit 22. As described above, in the second embodiment, the motor speed control circuit 100 is in the acceleration control state of accelerating the motor 11 when the speed voltage Vv is higher than the reference voltage Vref, and is in the deceleration control state of decelerating the motor 11 when the speed voltage Vv is lower than the reference voltage Vref, in a similar way to the first embodiment.

The motor driving circuit 23, in the same manner as in the first embodiment, drives the motor 11 to accelerate it when receiving the L level of drive signal Vdr, and drives the motor 11 to decelerate it when receiving the H level of the drive signal Vdr.

Here, the FG signal in the acceleration control state will then be described. In the acceleration control state, with the rotation speed of the motor 11 is increased, the period of the pulse of the FG signal corresponding to the rotation speed of the motor 11 is shortened and the time period of the L level increases within the output voltage Vo.

As a result, the speed voltage Vv drops so as to be matched to the reference voltage Vref. In the deceleration control state, on the contrary, with the rotation speed of the motor 11 being decelerated, the period of the pulse of the FG signal corresponding to the rotation speed of the fan motor is lengthened and the time period of the L level decreases within the output voltage Vo. As a result, the speed voltage Vv increases so as to be matched to the reference voltage Vref.

As seen above, since the motor speed control circuit 10 feeds back the speed voltage Vv corresponding to the rotation speed of the motor 11 and controls the rotation speed of the motor 11 so that the speed voltage Vv matches the level of the reference voltage Vref. Therefore the rotation speed of the motor 11 has a linear relation with the reference voltage Vref and the duty ratio of the H level of the PWM signal.

The operation of the motor speed control circuit 100 in the case the PWM signal whose duty ratio of the H level is zero is input under the predetermined temperature Ta will be described. When the PWM signal whose duty ratio of the H level is zero is input to the reference voltage circuit 200, the base electrode of the transistor Q101 becomes L level. As a result, the voltage Vref smoothed by the LPF becomes substantially the same level as the power supply VDD. At this time, the speed voltage Vv is lower than the reference voltage Vref, which puts the motor speed control circuit 100 into the deceleration control state. The motor speed control circuit 100, therefore, decelerates the motor 11 so as to match the speed voltage Vv to the reference voltage Vref. In order to set the speed voltage Vv to the power supply VDD, the H level pulses of the FG signal required to be stopped, which ultimately brings the motor 11 to a stop. Thus, when the duty ratio of the H level of the PWM signal is zero, the rotation speed of the motor reduces to zero regardless of a temperature.

Figure 15:
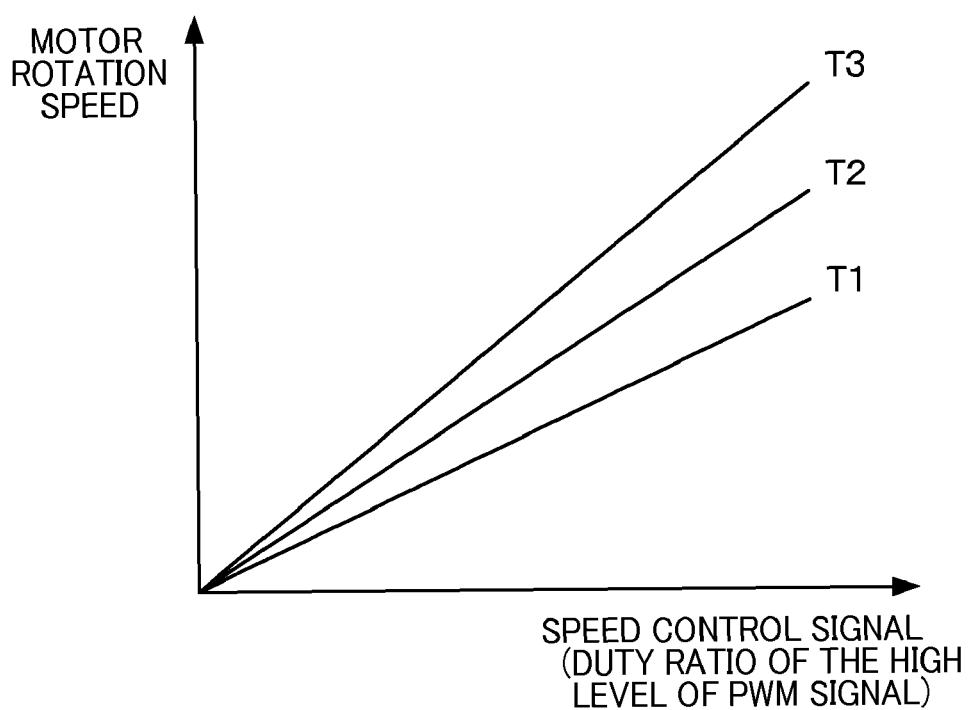
FIG. 15 is a diagram showing the relation between the rotation speed of the motor 11 and a speed control signal under different temperatures in the case where the motor 11 is driven by the motor speed control circuit 100 of the present invention.
Figure 16:
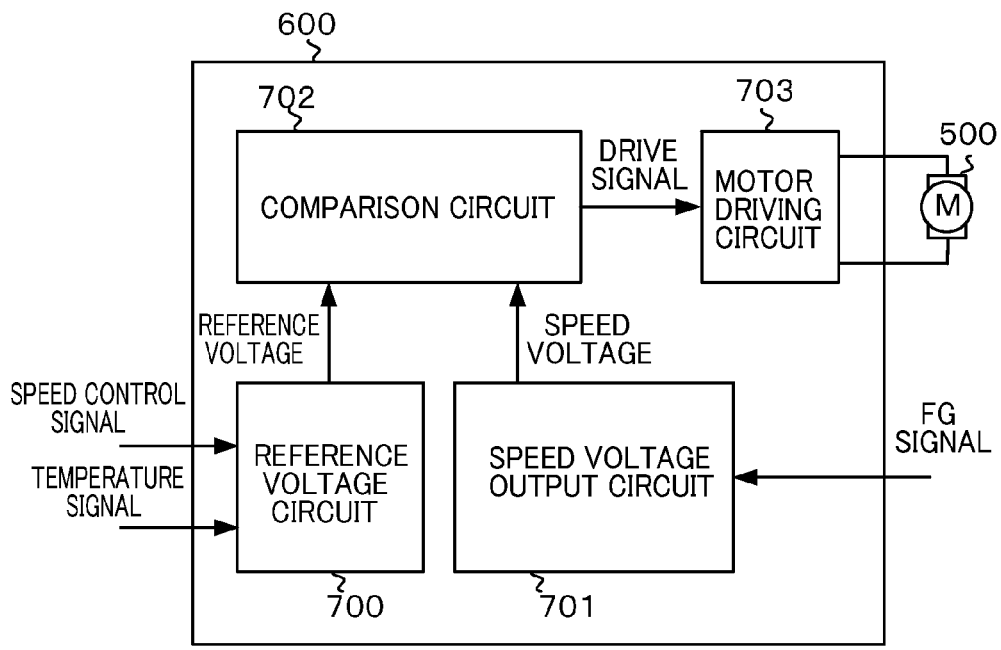
FIG. 16 is a diagram showing an example of a block diagram of a conventional motor speed control circuit.
Figure 17:
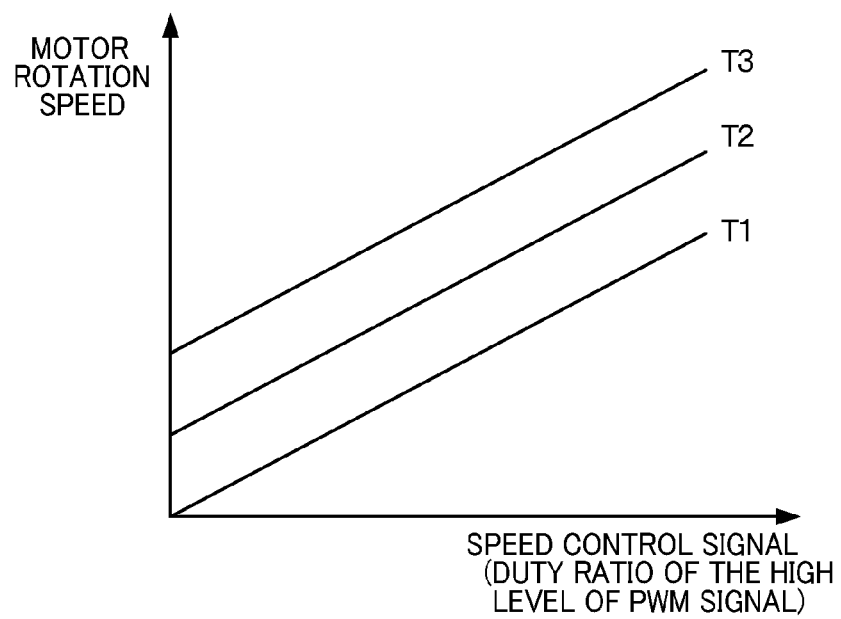
FIG. 17 is a diagram showing the relation between the rotation speed of a motor and a speed control signal under different temperatures in a conventional motor speed control circuit.

Description will be made about the operation of the motor speed control circuit 100 in the case where the duty ratio of H level of the PWM signal is predetermined and a temperature changes from the predetermined temperature Ta. FIG. 15 depicts the relation between the rotation speed of the motor 11 and the speed control signal under different temperatures in the case where the motor 11 is driven by the motor speed control circuit 100 of the present invention. FIG. 15 will be referred to when appropriate. A temperature increase reduces the resistance value of the thermistor RTH, thus the temperature current Ith is increased. As a result, a period over which the node voltage V2 is higher than the divided voltage V3 increases, which reduces the time period of the L level within one period of the output voltage Vo. Hence, the speed voltage Vv becomes higher than the reference voltage Vref, which put the motor 11 in the acceleration control state as described above. The rotation speed of the motor 11 is, therefore, controlled by the speed control circuit 100 to increase. As a result, the pulse period of the FG signal corresponding to the rotation speed of the motor 11 becomes short, and thereby increasing a time period of L level in the output voltage Vo. Thus, the speed voltage Vv drops so as to be matched to the reference voltage Vref.

On the other hands, when the temperature drops from the predetermined temperature Ta, the temperature current Ith decreases. As a result, a period over which the node voltage V2 is lower than the divided voltage V3 increases, so that the output voltage Vo becomes lower than the reference voltage Vref. Therefore, the operation becomes opposite to the above described operation and the motor 11 is put in the declaration control state. The rotation speed of the motor 11 is, therefore, decreased, and the pulse period of the FG signal corresponding to the rotation speed of the motor 11 becomes long. The time period of the L level in the output voltage Vo thus decreases, and the speed voltage Vv rises so as to be matched to the reference voltage Vref.

In this manner, even when the duty ratio of H level of the PWM signal is predetermined, the speed voltage Vv changes when a temperature rises, which leads to an increase in the rotation speed of the motor, i.e., the rotation speed of the fan. In the same manner, when a temperature drops, the motor speed control circuit 100 lowers the rotation speed of the motor, thus decreases the rotation speed of the fan.

The motor speed control circuit 100 of the second embodiment having the above configuration changes the rotation speed of the motor 11 linearly relative to the duty ratio of the H level of the PWM signal and also changes the rotation speed of the motor 11 according to a temperature and an actual rotation speed of the motor, and reduces the rotation speed of the motor 11 to zero regardless of a temperature when the PWM signal whose duty ratio of the H level is zero is input to stop the motor 11.

According to the invention of Japanese Patent Application Laid-Open Publication No. 2007-68344, a discrete resistor (hereinafter "series resistor") is connected to a thermistor, and a divided voltage generated by applying a voltage to the series resistor is input as a temperature signal to a motor speed control integrated circuit. In view of a reduction in the number of components, it is preferable to realize the series resistor in the motor speed control integrated circuit, however, it is difficult to control the resistance value and temperature coefficient of the resistor in the integrated circuit. Using a discrete component as the series resistor, therefore, is necessary. In the second embodiment, on the other hand, the thermistor RTH is connected to the emitter electrode of the NPN transistor Q111, and the voltage signal VTH (Ta) generated on the thermistor RTH is input as the temperature signal to the motor speed control circuit 100. As a result, according to the second embodiment, using only the thermistor RTH suffices for inputting the temperature signal, so that the number of components can be reduced compared to the above case.

For example, a PWM signal is used as the speed control signal in the second embodiment, but an analog signal may be used as the speed control signal. In such the case, the analog signal is input directly to the comparison circuit 22 in replacement of the reference signal Vref of the second embodiment.

In the second embodiment, the capacitor C102 is charged with the temperature current Ith to generate the speed voltage Vv. However, without supplying the temperature current Ith to the speed voltage output circuit 310, and the speed voltage Vv output from the speed voltage output circuit 310 of the second embodiment may be used as a bias voltage. In this case, instead of using the temperature current generating circuit 300, the bias voltage is applied to one end of a resistor element constituted by a thermistor and a resistor that are connected in series, and a divided voltage generated by voltage division through the thermistor and the resistor is determined to be the speed voltage Vv. This speed voltage Vv generated by voltage division through the thermistor and the resistor is the voltage that corresponds to the product of the bias voltage and a resistance ratio including a thermistor resistance. Thus, the speed voltage Vv corresponding to the rotation speed of the motor and a temperature can be generated to offer the same effect as described in the second embodiment.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:
1. A motor speed control circuit comprising:
a reference voltage circuit configured to output a reference voltage corresponding to a target rotation speed of a motor and a temperature, based on a speed control signal corresponding to the target rotation speed and a temperature signal corresponding to the temperature;
a comparison circuit configured to compare a speed voltage corresponding to a rotation speed of the motor with the reference voltage; and
a driving circuit configured to drive the motor so as to match a level of the speed voltage to a level of the reference voltage, based on a comparison result from the comparison circuit,
the reference voltage circuit outputting the reference voltage at a predetermined level independent of the temperature signal when the speed control signal for minimizing the corresponding to a minimum target rotation speed of the motor is input.
2. A motor speed control circuit comprising:
a first current generating circuit configured to generate a first current corresponding to a target rotation speed of a motor based on a speed control signal corresponding to the target rotation speed;
a second current generating circuit configured to generate a second current corresponding to a temperature based on a temperature signal corresponding to the temperature;
a third current generating circuit configured to generate a third current corresponding to a product of the first current and the second current;
a current-to-voltage conversion circuit configured to convert the third current to a reference voltage;
a comparison circuit configured to compare a speed voltage corresponding to a rotation speed of the motor with the reference voltage; and
a driving circuit configured to drive the motor so as to match a level of the speed voltage to a level of the reference voltage, based on a comparison result from the comparison circuit.

3. The motor speed control circuit of claim 2, wherein
the first current generating circuit is further configured to set the first current to zero when the speed control signal for minimizing the target rotation speed of the motor is input.

4. The motor speed control circuit of claim 3, wherein
the temperature signal is a voltage signal generated on a thermistor whose resistance value changes according to the temperature, and wherein
the second current generating circuit comprises:
a voltage output circuit configured to output a temperature voltage corresponding to the resistance value; and
a first transistor configured to output the second current as a result of application of the temperature voltage to a control electrode.

5. The motor speed control circuit of claim 4, wherein
the voltage output circuit comprises:
a second transistor whose control electrode is to be applied with a voltage at a predetermined level, and whose one electrode out of two electrodes different from the control electrode is connected to the thermistor, the one electrode being an electrode for controlling a conduction state together with the control electrode, the second transistor being configured to generate a temperature current corresponding to the resistance value; and
a current-to-voltage conversion element configured to generate the temperature voltage corresponding to the temperature current.

6. The motor speed control circuit of claim 2, wherein
the temperature signal is a voltage signal generated on a thermistor whose resistance value changes according to the temperature, and wherein
the second current generating circuit comprises:
a voltage output circuit configured to output a temperature voltage corresponding to the resistance value; and
a first transistor configured to output the second current as a result of application of the temperature voltage to a control electrode.

7. The motor speed control circuit of claim 6, wherein
the voltage output circuit comprises:
a second transistor whose control electrode is to be applied with a voltage at a predetermined level, and whose one electrode out of two electrodes different from the control electrode is connected to the thermistor, the one electrode being an electrode for controlling a conduction state together with the control electrode, the second transistor being configured to generate a temperature current corresponding to the resistance value; and
a current-to-voltage conversion element configured to generate the temperature voltage corresponding to the temperature current.

8. A motor speed control circuit comprising:
a speed voltage circuit configured to output a speed voltage corresponding to a rotation speed of a motor and a temperature, based on a speed signal corresponding to the rotation speed and a temperature signal corresponding to the temperature;
a comparison circuit configured to compare a reference voltage corresponding to a target rotation speed of the motor with the speed voltage; and
a driving circuit configured to drive the motor so as to match a level of the speed voltage to a level of the reference voltage, based on a comparison result from the comparison circuit,
wherein the speed voltage circuit is further configured to output the speed voltage corresponding to a product of the rotation speed and the temperature, based on the speed signal and the temperature signal.

9. The motor speed control circuit of claim 8, wherein
the speed signal is a pulse signal whose period changes according to a rotation speed of the motor, and wherein
the speed voltage circuit comprises:
a temperature current generating circuit configured to generate a temperature current corresponding to the temperature signal; and
a speed voltage output circuit configured to output the speed voltage corresponding to a product of the period of the pulse signal and an amount of the temperature current.

10. The motor speed control circuit of claim 9, wherein
the speed voltage is a voltage corresponding to a charging voltage of a capacitor supplied with the temperature current, and wherein
the speed voltage output circuit comprises a discharging circuit configured to discharge the capacitor at an interval corresponding to the period so as to set the charging voltage to a voltage corresponding to a product of the period of the pulse signal and the amount of the temperature current.

11. The motor speed control circuit of claim 10, wherein
the temperature signal is a voltage signal generated on a thermistor whose resistance value changes according to the temperature, and wherein
the temperature current generating circuit comprises:
a temperature voltage output circuit configured to output a temperature voltage corresponding to the resistance value; and
a transistor configured to output the temperature current as a result of application of the temperature voltage to a control electrode.

12. The motor speed control circuit of claim 9, wherein
the temperature signal is a voltage signal generated on a thermistor whose resistance value changes according to the temperature, and wherein
the temperature current generating circuit comprises:
a temperature voltage output circuit configured to output a temperature voltage corresponding to the resistance value; and
a transistor configured to output the temperature current as a result of application of the temperature voltage to a control electrode.

* * * * *